United States Patent [19]

Hesse et al.

[11] Patent Number: 5,274,571
[45] Date of Patent: Dec. 28, 1993

[54] ENERGY STORAGE SCHEDULING SYSTEM

[75] Inventors: Bradley J. Hesse, Dewitt; Steven W. Carlson, Fayetteville, both of N.Y.

[73] Assignee: The Fleming Group, Syracuse, N.Y.

[21] Appl. No.: 703,084

[22] Filed: May 20, 1991

[51] Int. Cl.5 .............................................. H02J 3/14
[52] U.S. Cl. ................................. 364/492; 364/493
[58] Field of Search ............................... 364/492, 493

[56] References Cited

U.S. PATENT DOCUMENTS

| | | | |
|---|---|---|---|
| 4,075,699 | 2/1978 | Schneider et al. | 364/492 |
| 4,253,151 | 2/1981 | Bouve | 364/492 |
| 4,337,401 | 6/1982 | Olson | 364/492 |
| 4,513,382 | 4/1985 | Faulkner, Jr. | 364/492 |

FOREIGN PATENT DOCUMENTS

| | | | |
|---|---|---|---|
| 03010 | 7/1979 | European Pat. Off. | 364/492 |
| WO02584 | 4/1988 | PCT Int'l Appl. | 364/492 |

*Primary Examiner*—Jack B. Harvey
*Assistant Examiner*—Thomas Peeso
*Attorney, Agent, or Firm*—Salzman & Levy

[57] ABSTRACT

The present invention features an energy storage scheduler that schedules the timing and extent of charging a storage device from the electric energy supply. The energy storage scheduler has a charge level device for receiving information representative of the level of charge of the storage device. A programmed measuring and refining mechanism is provided to quantify the load profile of the energy utilizing load system. A timer is connected to the energy storage scheduler to provide information representative of the ongoing time within the current cycle period. A price processor is connected to the energy storage scheduler for receiving and processing information representative of prospective time-varying prices of electric energy from the supply. Finally, a mechanism is provided to calculate, from the information available from the charge level device, the programmed measuring and refining mechanism, the timer and the price processor, optimal timing for charging the storage device to predetermined storage levels to achieve a minimal cost supply of the aggregate energy demands of the load system.

14 Claims, 7 Drawing Sheets

ENERGY STORAGE SCHEDULING SYSTEM

FIELD OF THE INVENTION

The present invention relates to the regulation or management of supply of electric power to load sites such as office buildings, hospitals, factories and the like which require comparatively great amounts of electric energy for load systems performing such functions as heating, cooling, or motor operation.

BACKGROUND OF THE INVENTION

Modern electric utility companies are confronted with various economic, regulatory, and environmentally related pressures which complicate, and sometimes prevent, construction of more generating capacity in response to market or service territory growth. As a consequence, although such companies usually give considerable attention to programs for energy conservation so as to moderate demand and thereby offset need for increased generating capacity, thought is currently being given by utilities to various strategies or techniques for managing or regulating customer demand for electric energy. The objective of such strategies from the utility point of view is to moderate the peaks and valleys of fluctuations in electric energy use over a given time frame such as a twenty-four hour day, and thereby smooth out the demand level over such a time period. This enables generating capacity already in place to be used most efficiently.

Electric energy users in turn have economic incentives to minimize the cost of their energy demands. Attention has therefore been focused from both supply side and demand side on efforts to achieve both reduced fluctuations in demand required to be met by the supplier, and derivation from such reduced fluctuations of lower costs for the user.

Prior art demand side management efforts on the part of utilities have involved such techniques as time-of-use pricing, in which prices are lowered to encourage filling of demand valleys and raised to moderate customer demand at peak hours, and automated shut-off of selected customer equipment such as water heaters during peak demand hours. Temporary shedding of loads in a rolling fashion in a given market or service territory is another known technique for moderating peak demand.

Unfortunately, in the aforementioned prior art systems, the user is required to provide certain startup information. For example, upon initial installation, the user is expected to provide the building design load and building use schedules, startup values for cooling load profile, noncooling electric load profile, and ambient temperature profile. Also, the user must provide maximum ton-hours of storage compacity, maximum chiller cooling rate, and maximum storage discharge rate in tons.

Such prior art techniques have lacked the sophistication required for timely consideration of all significant user-related parameters such as prospective next-day heating or cooling requirements or machine run time. They also lack the ability to respond promptly to changes in significant supplier-related factors such as variations in generating costs. Moreover, such prior art techniques rely on the user to provide a great number of initial parameters and design characteristics, which may or may not be reliable and are certainly inconvenient for the user to enter into the system periodically.

It would be advantageous and is, in fact, one of the objects of the present invention, to provide a dynamic adaptive energy scheduling system that will allow variations in parameters, transparent to the user. In the course of operating the present system of the invention, certain parameters are obtained, but need not be expressly entered into the system by the operator.

Prior art systems may also require a user to specifically provide the high and low ambient temperatures predicted by the National Weather Service for the next day. Once again, the use of a non-automated system for providing this information and the lack of updating such information has resulted in a serious impediment to the use of such systems. The fact is, that few operators take the time necessary to input this information on a daily basis and, even when they do, the information can become outdated rapidly as weather conditions change during the day. Thus, it would be advantageous to provide an energy scheduling system that calculates and recalculates predictive weather information on the basis of ongoing, changing data acquired by the system automatically and periodically.

SUMMARY OF THE INVENTION

Accordingly, the principal object of the present invention is to provide scheduling means for regulating the charging of energy into storage means in accordance with information relating to a variety of factors including predicted load demand, present level of energy already stored in the storage means, and periodically updated and refreshed information as to prospective temperature predictions and supplier prices.

Another object of the present invention is to provide improved means for managing the supply of electric energy to a load site or load system based on hourly utility-supplied pricing structures in a manner to ensure the user adequate supply without interruption and at attractive cost levels, and to ensure the supplier desirable moderation of demand fluctuations.

Another object is to provide such an energy scheduling system which involves means for the temporary storage of energy, at or near the site of the user, and which is capable of being pre-charged at optimally low cost to the user in anticipation of subsequent user demand.

Still another object is to provide an energy storage scheduling system of the foregoing character wherein the user-adjacent energy storage system may be of the primary energy storage type (i.e., capable of storing electric energy itself as by means of batteries or capacitors or the like), or may be of a type for storing thermal or potential energy.

Another object is to provide such an energy scheduling system wherein the storage means may be sized for storage of only a fraction of the load system total demand in a given demand cycle period such as a consecutive twenty-four hour daily period and wherein much of the stored energy is used and relatively little is wasted.

In accordance with the present invention, there is provided an energy utilizing load system having energy demands which vary and whose total demand for energy is satisfied by input of energy directly from an electric energy supply and input of energy released from an energy storage system, previously charged from the electric energy supply.

The energy storage scheduler of this invention schedules the timing and extent of charging a storage means from the electric energy supply. The energy storage scheduler has charge level means for receiving information representative of the level of charge of the storage means. A programmed measuring and refining mechanism is provided to quantify the load profile of the energy utilizing load system. A timer is connected to the energy storage scheduler to provide information representative of the ongoing time within the current cycle period. A price processor is connected to the energy storage scheduler for receiving and processing information representative of prospective time-varying prices of electric energy from the supply. Finally, a mechanism is provided to calculate, from the information available from the charge level means, the programmed measuring and refining mechanism, the timer and the price processor, optimal timing for charging the storage means to predetermined storage levels to achieve a minimal cost supply of the aggregate energy demands of the load system.

BRIEF DESCRIPTION OF THE FIGURES

These and other objects of the invention will become more readily apparent from a consideration of the following description together with the accompanying drawings, wherein.

DETAILED DESCRIPTION OF THE PREFERRED EMBODIMENT

Figure 1:
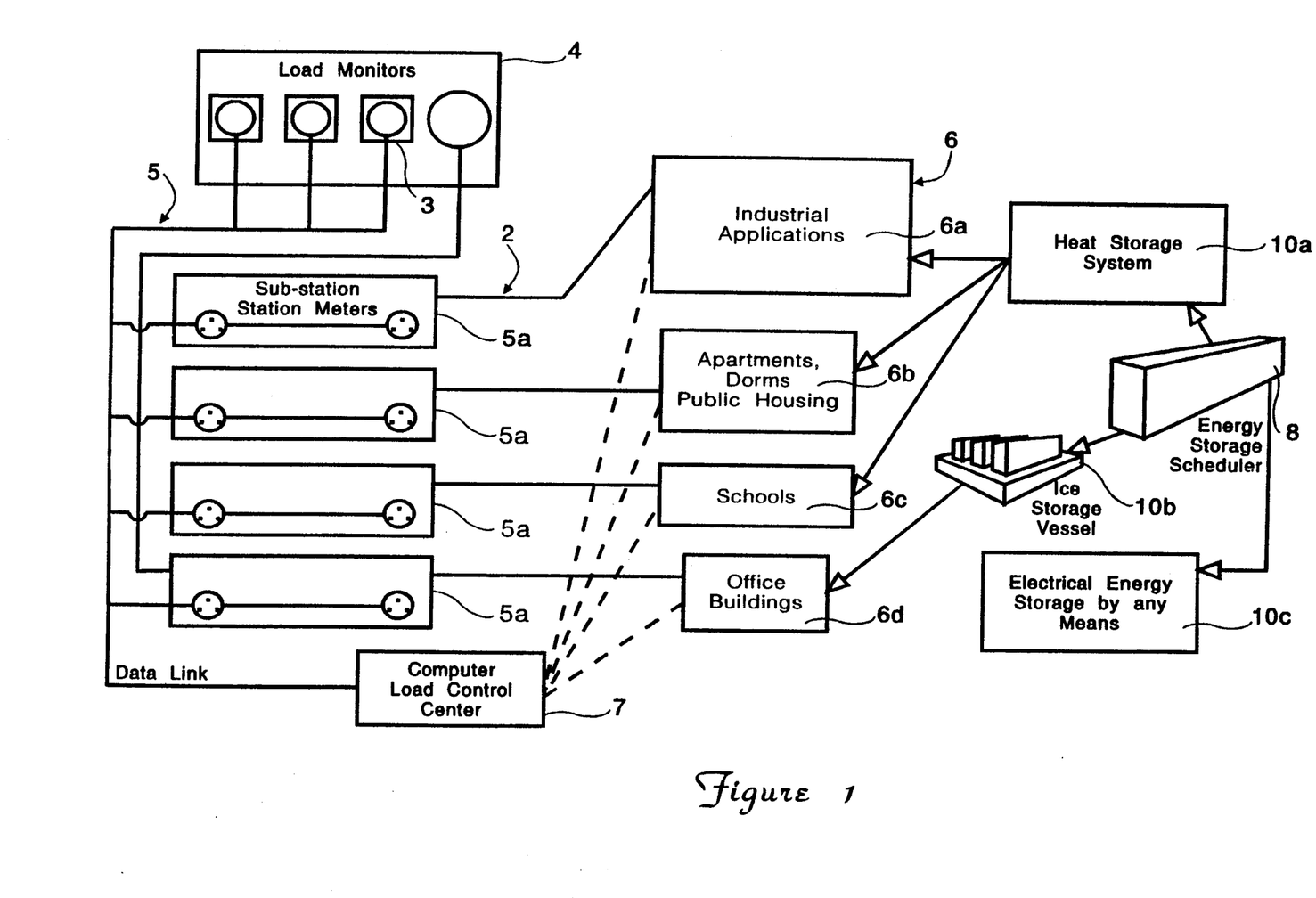
FIG. 1 is a diagrammatic and schematic view of an electric energy supply system including structures and schedulers constructed and arranged in accordance with the present invention.

The diagram of FIG. 1 depicts an electric utility 2 having an electric energy supply 4 for serving the demands of a load system 6. Electric utility 2 includes load monitoring equipment 3 and typically a plurality of power substations 5 having their own load monitoring equipment 5a. A utility load control center 7 is connected to all load monitoring devices 3, 5a for monitoring the aggregate utility load and for influencing consumer load through interruption of power or through pricing.

The load system 6 may include storage apparatus 6a, which forms no part of the present invention. Storage apparatus 6a is disposed in each of the structures 6b being provided with energy. The load system 6 may consist of one or more pieces of electric energy utilizing apparatus, not shown, such as, for example, heating equipment, cooling equipment, factory machinery drive motors, or electric motors for other applications.

In the contemplation of the present invention, the load system 6 is normally of such a nature as to have an aggregate demand for electric energy which varies in a periodic or cyclical fashion in a given time frame such as a twenty-four hour day. If the load system is largely cooling (HVAC) equipment for comfort conditioning of office personnel work spaces, it will be appreciated that the demand for energy for HVAC is likely to be greatest during that portion of the twenty-four hour day when the office personnel are about to arrive or are present. Furthermore, varying weather conditions drive heating and cooling loads directly. Consequently the energy demand of the cooling equipment will be likely to vary day by day.

An energy storage scheduler 8 is provided to schedule storage of energy by receiving information from various sources as described hereinbelow and calculating appropriate values representative of decisions to be used by the storage apparatus 6a.

Figure 2:
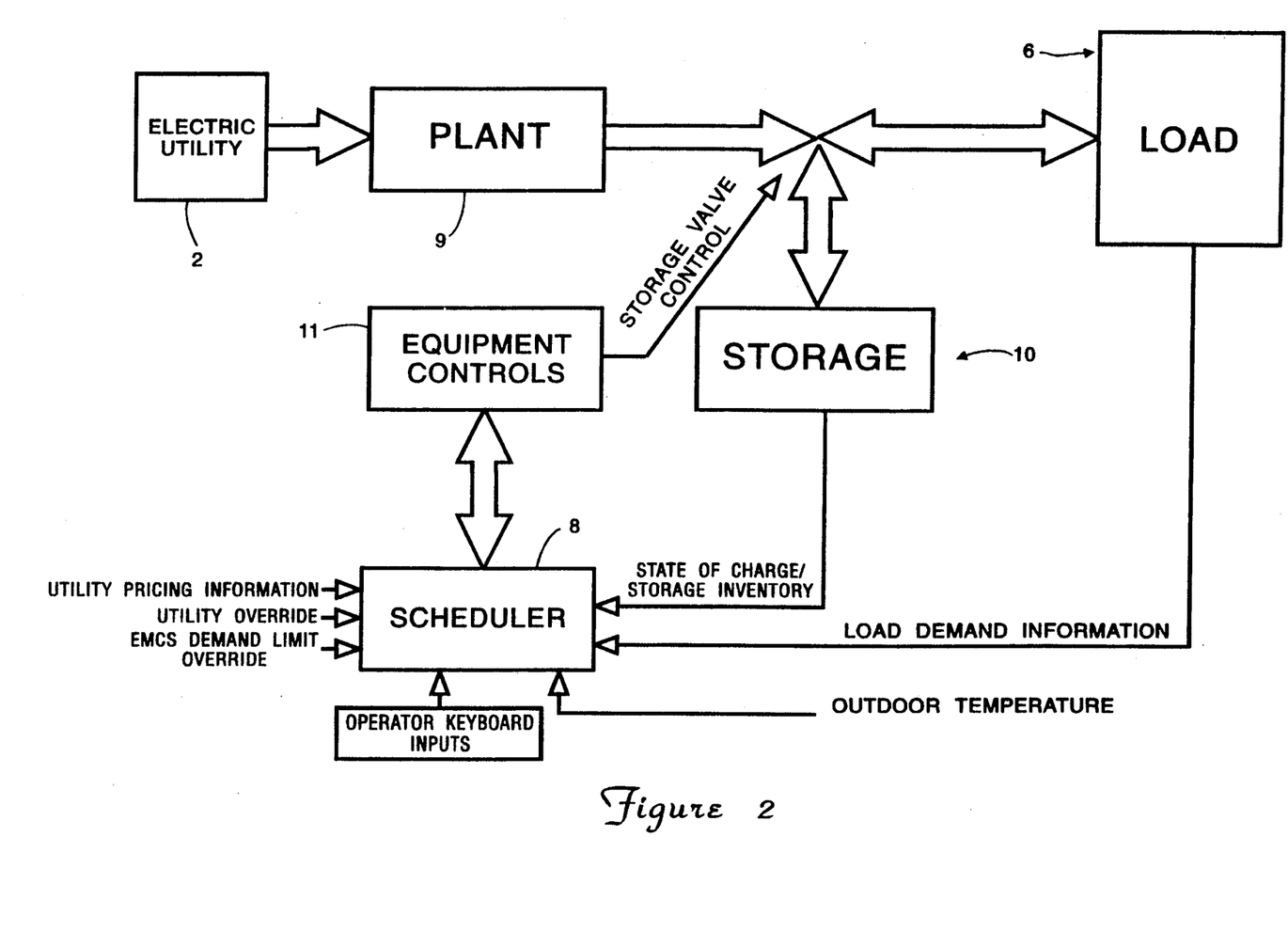
FIG. 2 is a block diagram of a scheduler and associated elements of the load system shown in FIG. 1.

Referring now also to FIG. 2, there is shown a block diagram of the scheduler 8 (FIG. 1) and related components in the energy scheduling system. For purposes of brevity, identical components are identified throughout the figures with identical reference numerals.

Electric energy flows from power utility 2 to the structures 6b (FIG. 1) which contain apparatus shown generally as reference numeral 6a (FIG. 1). This apparatus comprises three components: plant equipment 9 for converting electrical energy into thermal energy including cooling energy; energy storage 10 which stores energy for future use; and equipment controls 11 for dividing energy between storage 10 and load 6, controlling plant operations, etc.

Connected to equipment controls 11 is the energy storage scheduler 8 which provides a supervisory function to the equipment controls 11. For example, signals may be generated by scheduler 8 which are applied to equipment controls 11. The information from scheduler 8 may instruct equipment controls 11 to charge storage device 10 at a specified time. It is the equipment controls 11, however, that actually initiates such charging operation of the storage devices 10. Without the scheduler 8 providing supervisory scheduling information to the equipment controls 11, equipment controls would usually charge the storage devices 10 at a predetermined time regardless of the cost of doing so. Thus, scheduler 8 provides a valuable function in providing intelligence to the system so that the cost of charging the storage devices 10 is minimized.

Scheduler 8 is also adapted, as hereinbelow described in greater detail, to receive feedback information from components such as the storage devices 10 and the equipment controls 11. Such information is used by scheduler 8 to update its scheduling. In addition, scheduler 8 is adapted to receive data from external sources representative of outdoor temperature, pricing information or certain other information that would override the normal operation of the system, such as special events, additional load requirements, storage devices and the like. In this way, the system can adapt to new situations dynamically and scheduler 8 can reflect ongoing changes in the system and store such historical data for future reference.

Scheduler 8 is also adapted to receive overriding information from an operator, in certain unforeseeable emergencies. Scheduler 8 can also receive utility override information which may occur during high utility demand periods. In other words, scheduler 8 can be an integral component in a load-shedding operation, when required. Moreover, scheduler 8 is also adapted to receive information from an energy management control system (EMCS) which may be part of a building complex.

Referring now to FIG. 3, there is shown a flow chart of scheduler 8 operations in accordance with the present invention.

Figure 3A:
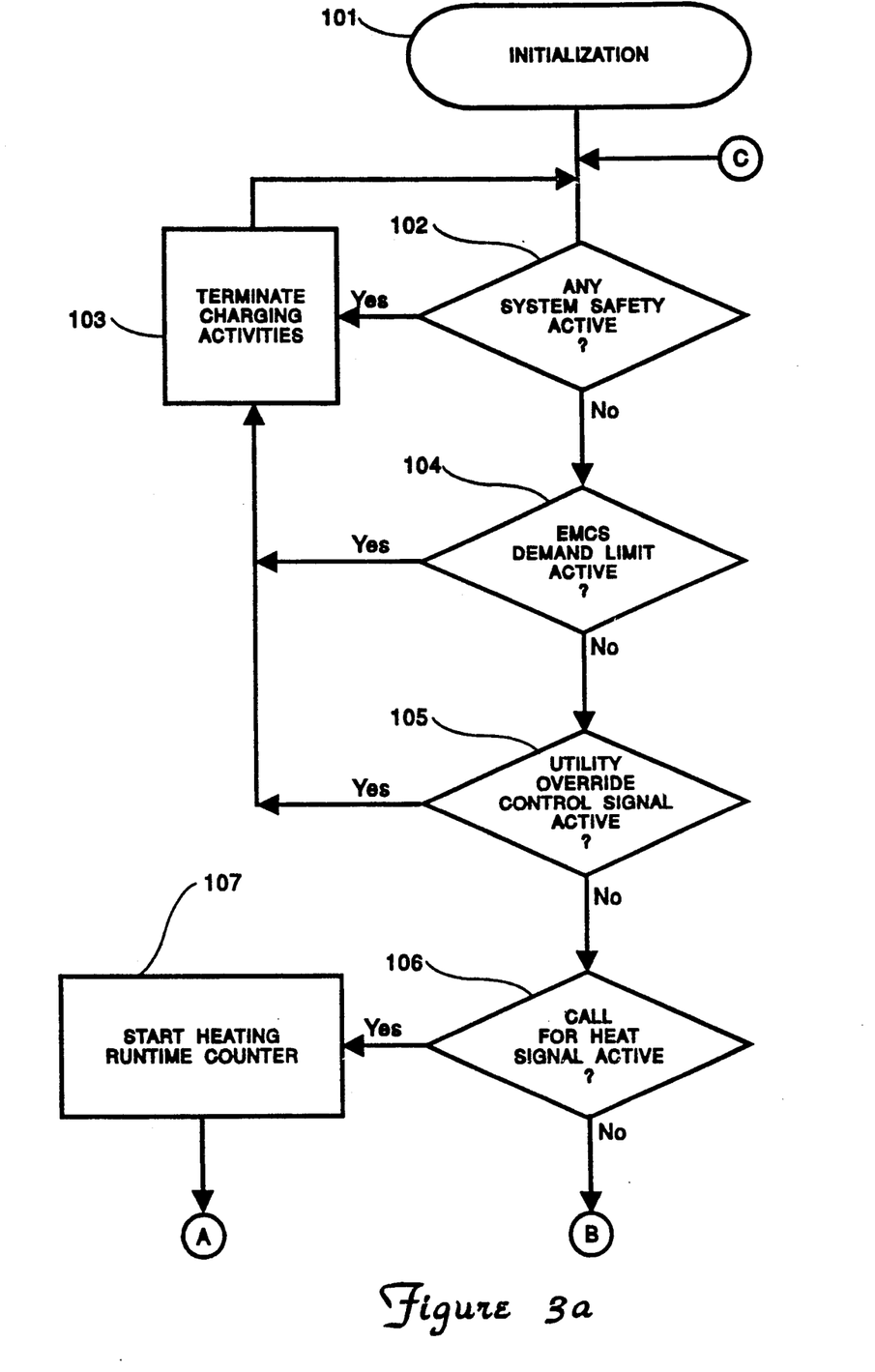
FIGS. 3a-3e comprise a flow chart of scheduler operations.

During system initialization, step 101, the following information is entered, either manually by the operator or automatically:

a) present date and time;
b) energy storage system charge input rate;

c) storage system type(s) being controlled (menu choices);
d) input port configuration information by channel:
   Temperature Inputs
   Runtime Inputs
   Utility Control Signals
   EMCS Control Signals
   Manual Override Signals
   State of Charge Senor Type;
e) output control port configuration information by channel:
   Heating System Charge Enable
   Cooling System Charge Enable
   Auxiliary HVAC System Charge Enable
   Other Energy System Charge Enable;
f) channel multipliers and off-sets;
g) pricing format (menu);
h) source of pricing and temperature prediction data (e.g., local keyboard, modem, radio frequency link);
i) data format information (menu); and
j) full load (worst case) conditions.

A safety, step 102, can be any contact closure input to the energy storage scheduling system. Examples of a safety input are heat and smoke alarms.

A demand limit, step 104, is a contact closure input from any source, such as an energy management system, which is used to shed connected electric loads in an effort to curtail usage and maintain a maximum energy demand. This is true for any energy source. When the energy storage scheduling system receives a contact closure on the demand limit input port, step 104, it immediately terminates excess energy usage step 103. Thus, if the system is charging the energy storage medium, that activity is suspended until the demand limit signal has been released.

A utility radio control override signal, step 105, is any contact closure input to the energy storage scheduling system generated as a result of any utility control system signal. The control signal is typically intended to terminate charging of the energy storage medium.

The call for heat signal, step 106, is indicative of building heating load.

Figure 3B:
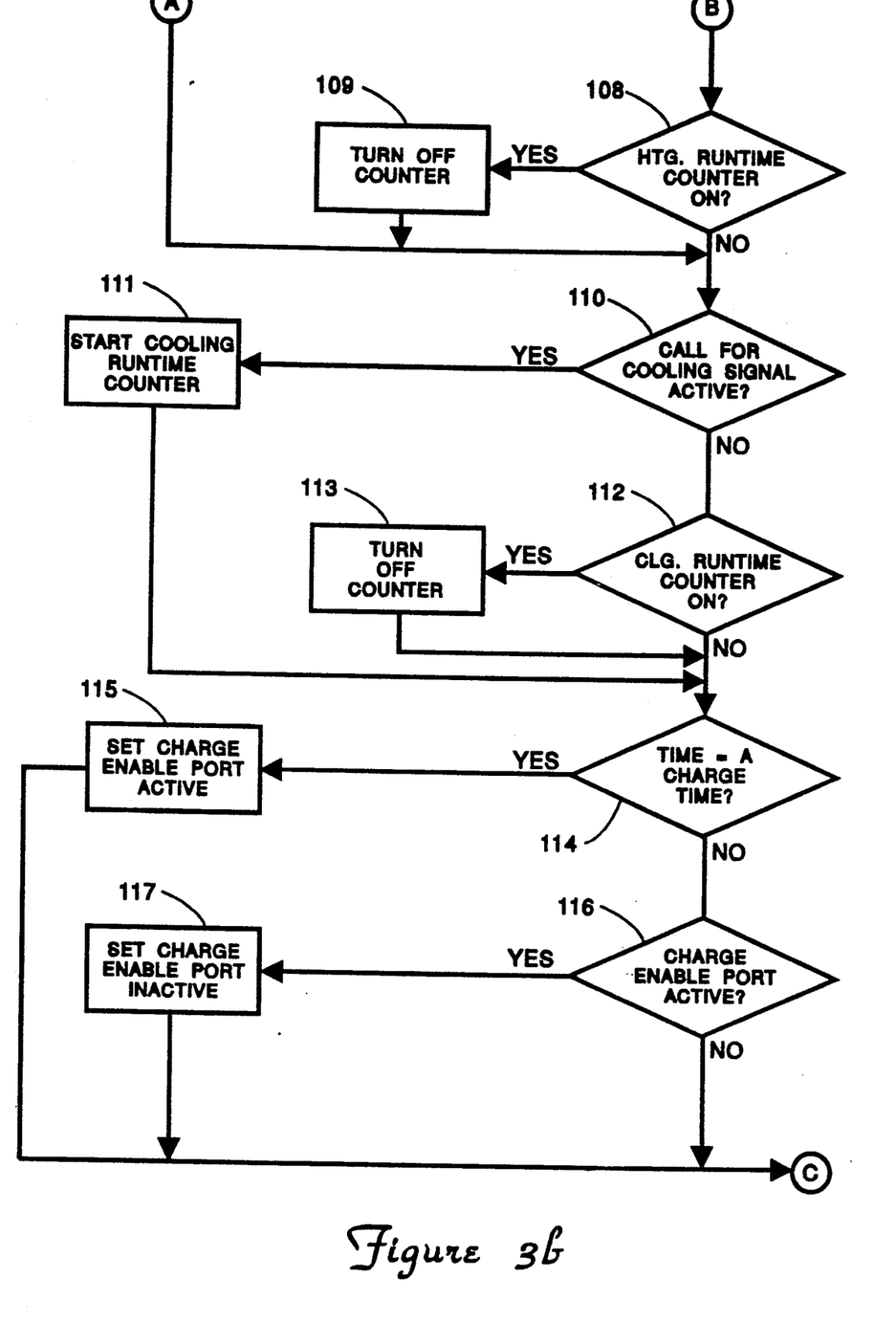

The call for cooling signal, step 110, is indicative of building cooling load.

Auxiliary HVAC is enabled, step 119, when there is a continuous call for heating or cooling and conditioned space temperature is a) falling in heating mode, or b) rising in cooling mode.

Figure 3C:
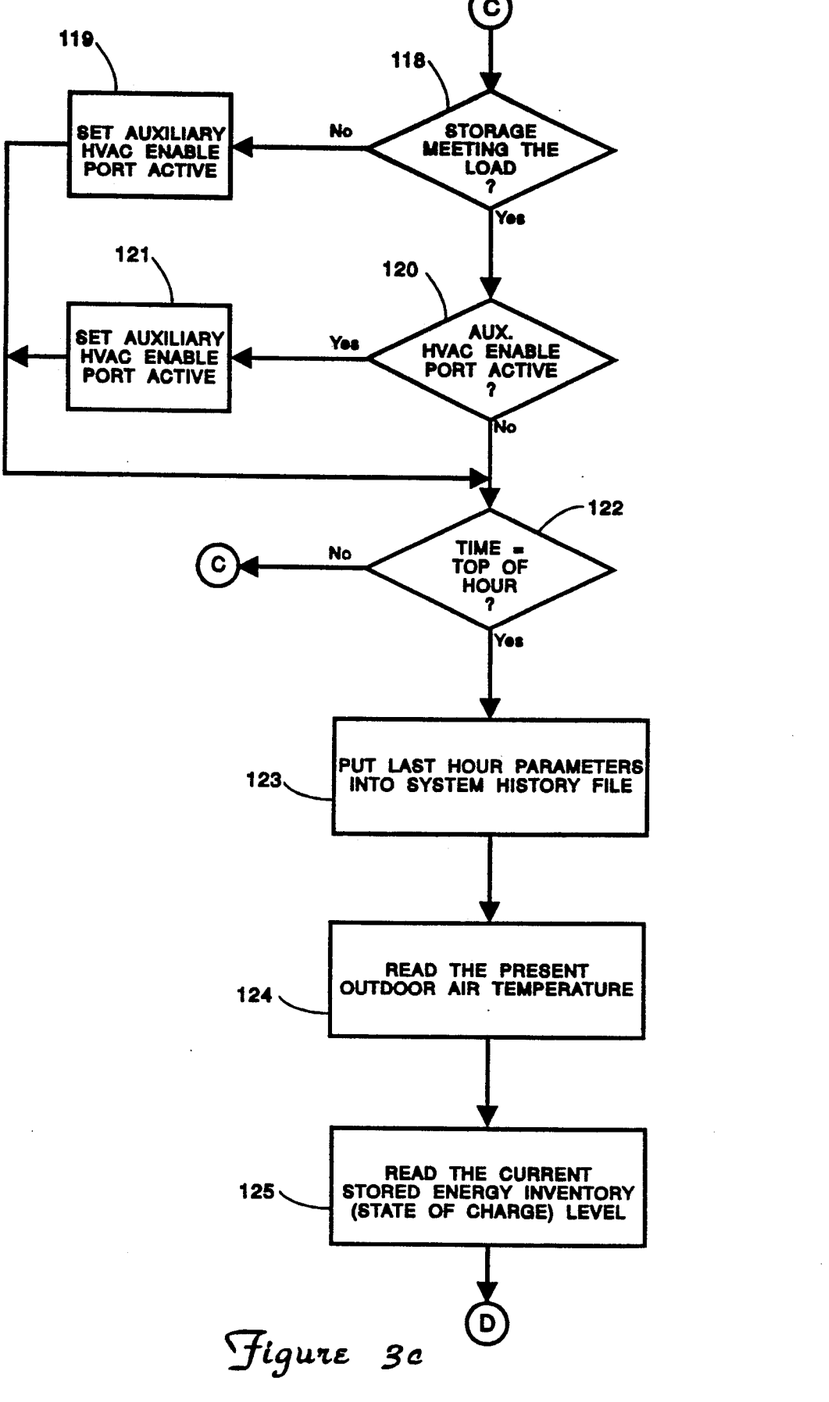

The current storage inventory, step 125, is derived from an energy balance maintained on the storage system. Measured storage output to load and charge operating time, along with charging capacity, are all used to maintain the energy balance.

Outdoor air prediction, step 126, is refined by a ratio adjustment of measured temperature and predicted temperature.

Adjustments to the predicted load, step 127, are made based on the ratio of measured temperature to predicted temperature and the difference between previous predictions and actual load.

Adjustments to the hourly estimated stored energy inventory, step 128, are based on actual last hour usage and new predicted building load.

Rate-of-charge may not match input capacity for certain types of systems (e.g., simultaneous charge and discharge). The time to reach a desired storage inventory while meeting the load is determined, step 129, by the ratio of required storage to system input capacity minus load.

Figure 3D:
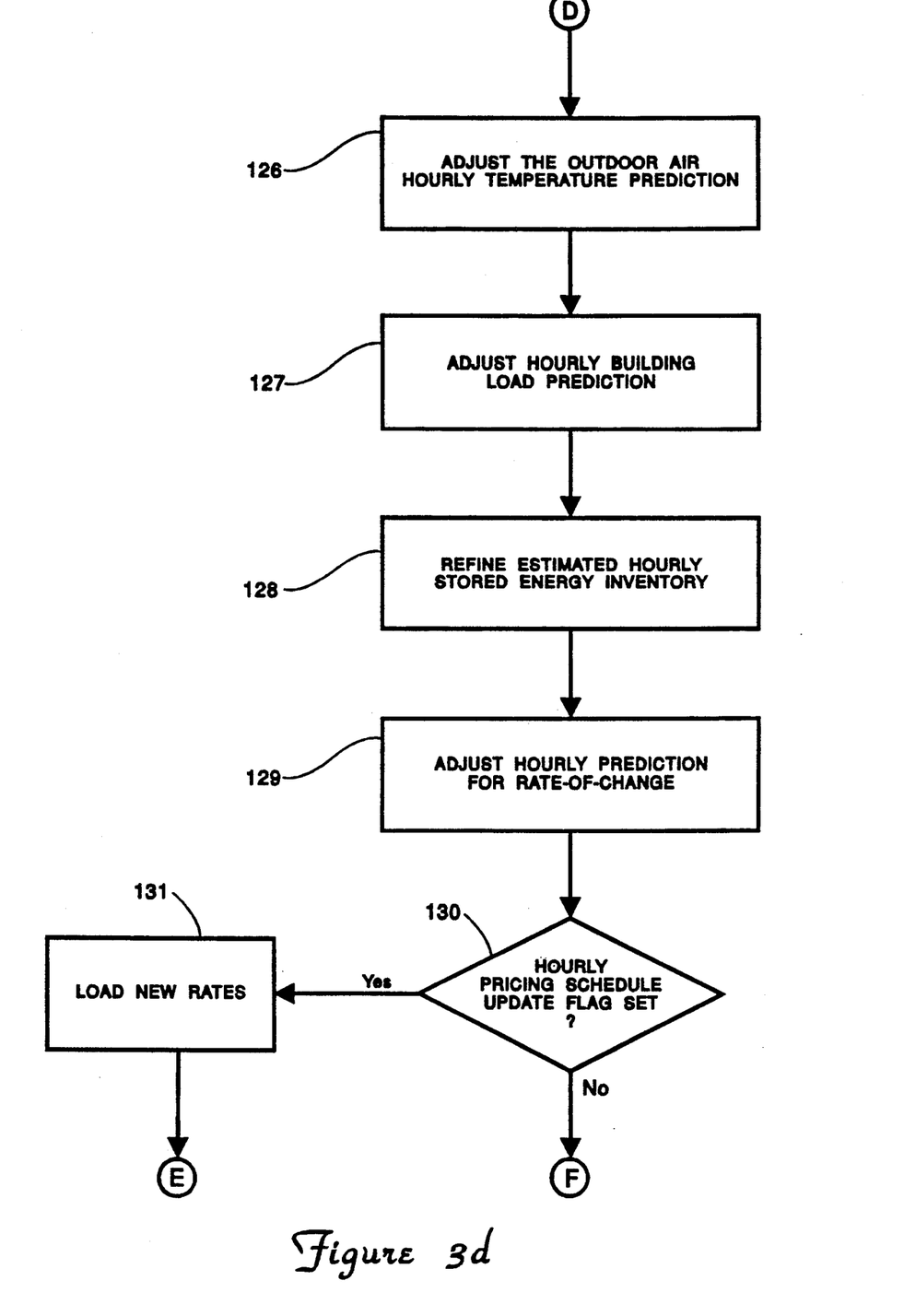

The next day's hourly load profile is predicted, step 132, by starting with the last similar day as the base condition. During initialization, full load prediction is assumed. The total load is distributed over the hourly load shape, making a ratio adjustment based on predicted and actual weather data. An uncertainty factor is added to the hourly loads.

Charge periods are planned, step 133, so that the lowest cost hour is used to make up the storage deficit before storage is depleted.

Rate-of-charge or charge time is reduced, step 134, so that the storage charge input meets only the predicted storage deficit.

Figure 3E:
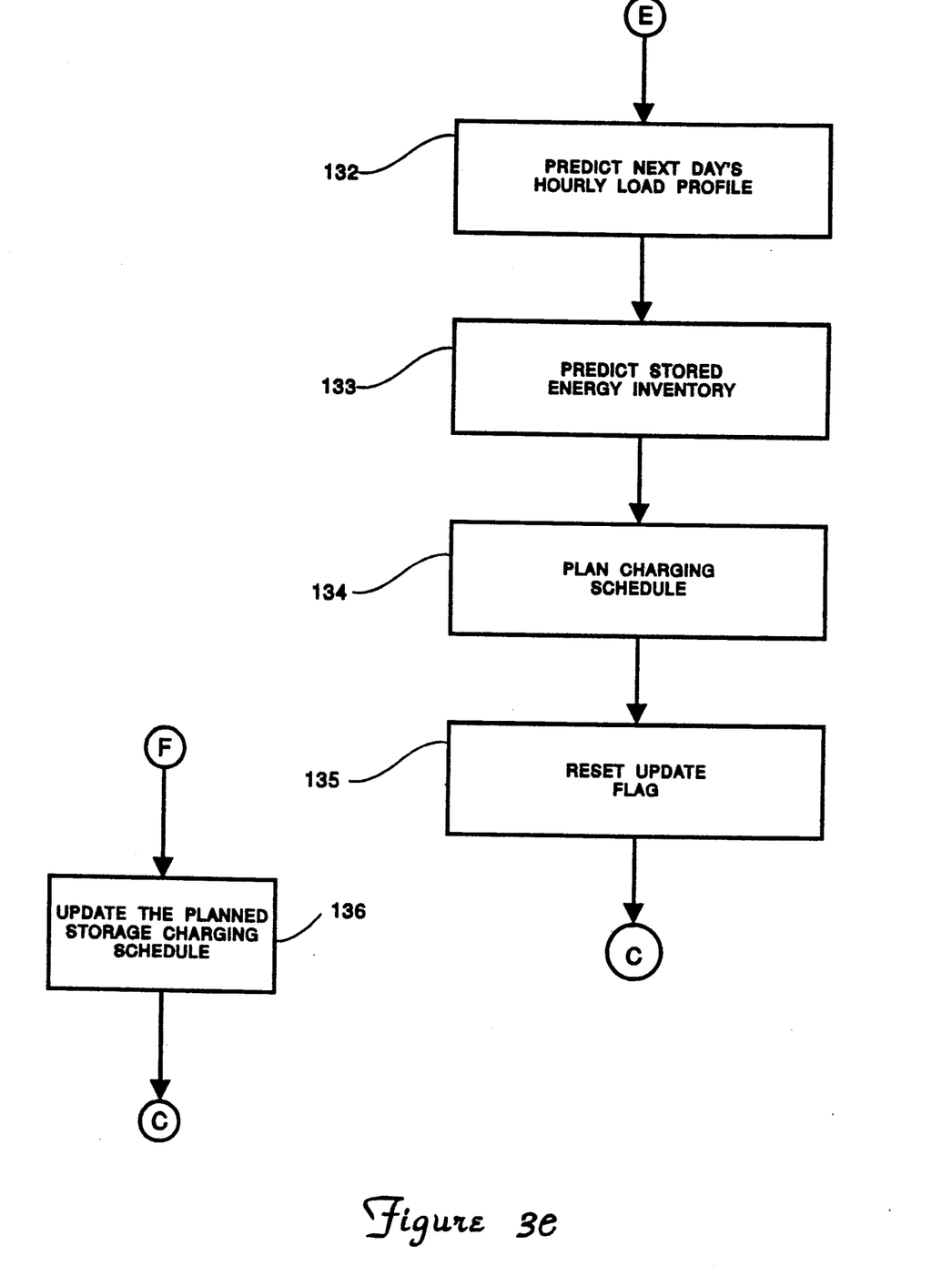

The planned charging schedule is refined, step 136, based on current inventory, next hour predicted load and rate-of-charge.

The purpose of energy storage scheduler 8 is to achieve the goals of a) smoothing demand from load system 6 on supply 4 (FIG. 1) for the benefit of the supplying utility, and b) minimizing the total cost of energy supplied to load system 6. Scheduler 8 is programmed to apprise equipment controls 11 to begin charging storage devices 10 and/or to provide energy to the load 6, based on inputs to scheduler 8 of information regarding a number of scheduling factors. Such factors include the current level or quantity of energy already stored in storage means 10 and currently available for release to load system 6. This factor may be continuously monitored directly from storage means 10.

Another significant control factor is information predictive of energy demand of load system 6 during each hour, fractional hour or other time increment. For example, where the load system 6 is involved with heating, cooling, or other personal comfort-related functions, information predictive of weather conditions anticipated to prevail during the next time period is supplied to scheduler 8 by means of a conventional outside temperature sensor, not shown.

Time information continuously providing the current time is supplied to scheduler 8 so that time-related decisions of the scheduler 8 can be time-referenced.

Finally, it is a particular feature of the present invention that the scheduler 8 is supplied with information, periodically, as to the expected or predicted hour-by-hour prices to be charged by the utility 2 during each hour, or selected time increment.

With the above-described inputs it will be appreciated that the scheduler 8 serves as a calculator or computer for determining how best to supply the predicted demands of load system 6 at minimum cost to the user. The utility 2, by adjusting or designing its time-of-use and/or real-time prices, can influence scheduler 8 decisions and thereby smooth demand on its supply system through valley filling and peak shaving. Scheduler 8 provides sophisticated and timely regulation of energy flow from supply 4, as influenced for benefit of the utility by its pricing structure, and for benefit of the user by minimum cost goals. Moreover, the scheduler 8 enables full advantage to be taken of price changes from the utility, which may occur hourly or even more frequently in real time as conditions within the utility generating system vary.

Charge decisions of the scheduler 8 will also require taking into account the capacity limits of storage means 10 relative to total anticipated demand of load system 6, and the desirability of not wasting stored charge, as might be possible, for example, when thermal energy is stored, which gradually dissipates and degrades over time if not used.

Scheduler 8 may be a commercially available computer, such as an IBM PC, or microcontroller programmed to receive the inputs described heretofore, and to make energy storage decisions at intervals of any desired length during the cycle period of load system 6.

From the foregoing description and the accompanying drawing, it will be apparent that the present invention provides, for use with energy storage means as described, improved means for managing and regulating energy demand to achieve beneficial moderation of demand peaks and valleys while responding promptly to continually updated and refreshed pricing information so as to optimize user cost savings. The invention is not limited to the precise embodiment shown in the illustrative drawing and various modifications and changes may, it will be recognized, be made by those skilled in the art without departing from the scope and spirit of the invention, as defined by the appended claims.

What is claimed is:

1. A dynamic, adaptive energy scheduling system operating on an hourly basis and receiving feedback information with respect to an energy network or system under its control, said dynamic, adaptive energy scheduling system comprising:
   storage means for storing electrical energy;
   electrical energy generating means for supplying electrical energy to said storage means;
   electrical energy consumption means electrically connected to said storage means for drawing electrical energy therefrom in order to run electrical equipment;
   a programmable electrical energy scheduling means connected between said storage means, said electrical consumption means and said electrical energy generating means, and operating on an hourly basis, said programmable electrical energy scheduling means being programmed with data representing previous energy consumption and temperature cycles of said electrical energy consumption means, and receiving data representing hourly temperature data and energy consumption data from said electrical energy consumption means, said programmable electrical energy scheduling means receiving information from said storage means with respect to its state of electrical charge, said programmable electrical energy scheduling means receiving electrical energy pricing information on an hourly basis from said electrical energy generating means and possible override signals indicative of electrical energy generating emergencies, said dynamic adaptive energy scheduling system having adaptive behavior reflecting ongoing changes or load-shedding requirements of said electrical generating means, said programmable energy scheduling means predicting and scheduling future energy usage of said electrical energy consumption means, based upon a previous energy profile corresponding to a similar energy usage cycle of said electrical energy consumption means and the most recently received data in order to provide efficient storage and an electrical energy draw from said storage means.

2. A dynamic, adaptive energy scheduling system in accordance with claim 1, wherein said electrical energy consumption means includes at least one of the following: a heating system, a cooling system, electrical control devices, buildings, schools, housing facilities and factories.

3. A dynamic, adaptive energy scheduling system in accordance with claim 1, wherein said programmable electrical energy scheduling means comprises a 4. A dynamic, adaptive energy scheduling system in accordance with claim 1, wherein said programmable electrical energy scheduling means comprises a microcontroller.

5. A dynamic, adaptive energy scheduling system in accordance with claim 3, wherein said computer is connected to an energy management control system.

6. A dynamic, adaptive energy scheduling system in accordance with claim 3, wherein said electrical energy generating means includes an electrical utility.

7. A dynamic, adaptive energy scheduling system in accordance with claim 3, wherein said programmable electrical energy scheduling means includes means for updating energy profile information.

8. A dynamic, adaptive energy scheduling system operating on a real-time basis, and receiving feedback information with respect to an energy network or system under its control, said dynamic, adaptive energy scheduling system comprising:
   storage means for storing electrical energy;
   electrical energy generating means for supplying electrical energy to said storage means;
   electrical energy consumption means electrically connected to said storage means for drawing electrical energy therefrom in order to run electrical equipment;
   a programmable electrical energy scheduling means connected between said storage means, said electrical consumption means and said electrical energy generating means, and operating on a real-time basis, said programmable electrical energy scheduling means being programmed with data representing previous energy consumption and temperature cycles of said electrical energy consumption means, and receiving data representing real-time temperature data and energy consumption data from said electrical energy consumption means, said programmable electrical energy scheduling means receiving information from said storage means with respect to its state of electrical charge, said programmable electrical energy scheduling means receiving electrical energy pricing information on a real-time basis from said electrical energy generating means and possible override signals indicative of electrical energy generating emergencies, said dynamic, adaptive energy scheduling system having adaptive behavior reflecting ongoing changes or load-shedding requirements of said electrical generating means, said programmable energy scheduling means predict and schedule future energy usage of said electrical energy consumption means, based upon a previous energy profile corresponding to a similar energy usage cycle of said electrical energy consumption means and the most recently received data in order to provide efficient storage and an electrical energy draw from said storage means.

9. A dynamic, adaptive energy scheduling system in accordance with claim 7, wherein said energy consumption means includes at least one of the following: a heating system, a cooling system, electrical control devices, buildings, schools, housing facilities and factories.

10. A dynamic, adaptive energy scheduling system in accordance with claim 8, wherein said programmable electrical energy scheduling means comprises a computer.

11. A dynamic, adaptive energy scheduling system in accordance with claim 8, wherein said programmable electrical energy scheduling means comprises a microcontroller.

12. A dynamic, adaptive energy scheduling system in accordance with claim 10, wherein said computer is connected to an energy management control system.

13. A dynamic, adaptive energy scheduling system in accordance with claim 8, wherein said electrical energy generating means includes an electrical utility.

14. A dynamic, adaptive energy scheduling system in accordance with claim 8, wherein said programmable electrical energy scheduling means includes means for updating energy profile information.

* * * * *